Patented Aug. 5, 1930

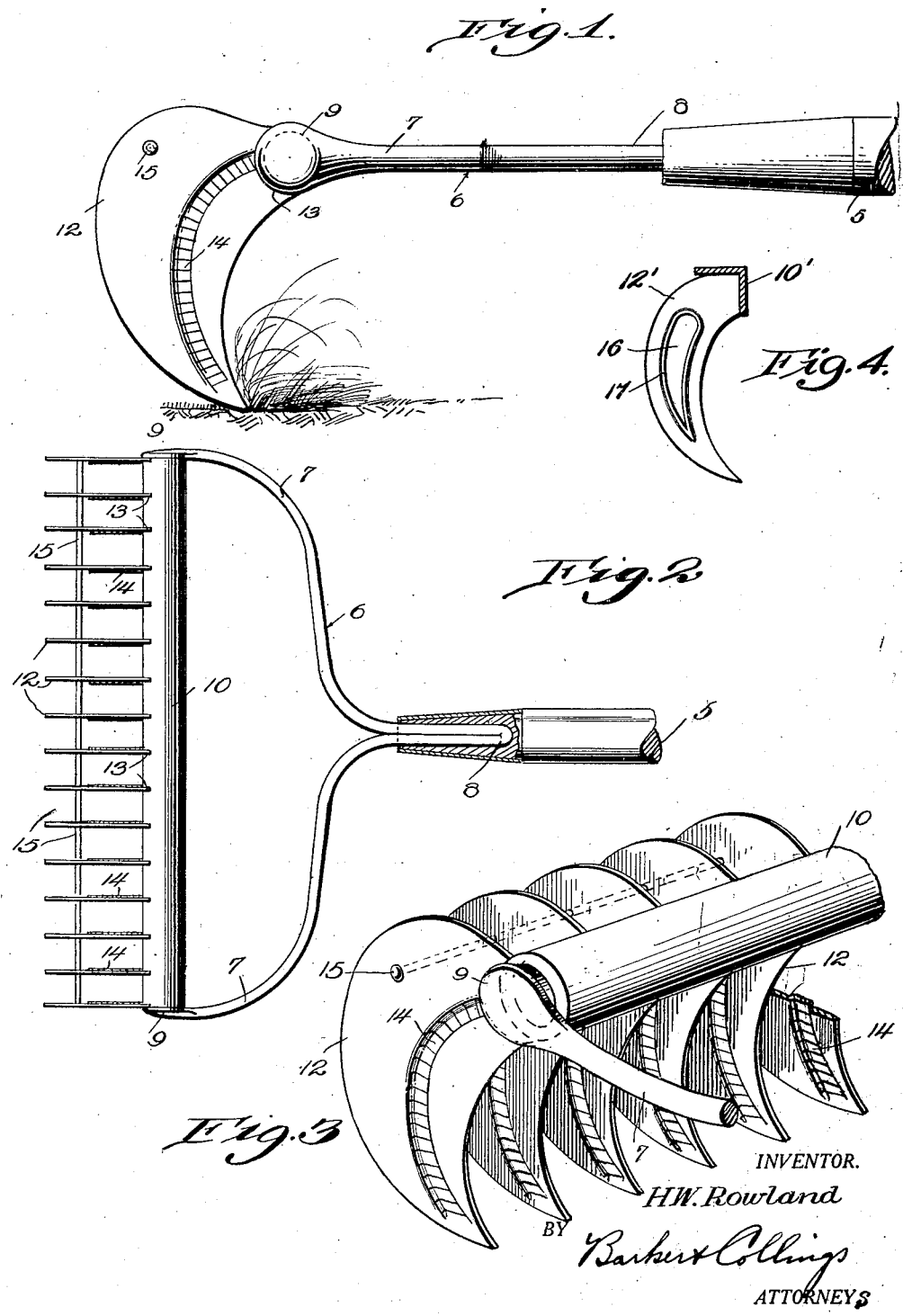

1,772,113

UNITED STATES PATENT OFFICE

HAROLD WADE ROWLAND, OF GRAND ISLAND, NEBRASKA

RAKE

Application filed July 5, 1928. Serial No. 290,438.

This invention relates to hand rakes of the garden variety and has for one of its objects to provide an implement of this character which will be simple in construction, comparatively inexpensive to manufacture, and more efficient in use than those which have been heretofore proposed.

A further object of the invention is to provide a rake having sheet metal teeth or tines of substantially crescent shape whereby a relatively great depth is provided which tends to prevent grass and leaves from intertwining about the tines and thereby clogging the rake.

With the above and other objects in view which will appear as the description proceeds the invention consists in the novel details of construction and combinations and arrangements of parts more fully heretofore disclosed and particularly pointed out in the claim.

Referring to the accompanying drawings forming a part of this specification, in which like reference characters designate like parts in all the views:

Fig. 1 is a side elevational view of a rake constructed in accordance with the present invention.

Fig. 2 is a top plan view partly in section of the rake shown in Fig. 1,

Fig. 3 is a fragmental perspective view showing a detail of the frame construction, and Fig. 4 is a detail cross sectional view of a slightly modified form of the invention.

In the said drawings the numeral 5 indicates a suitable handle in one end of which is secured a frame member 6 which preferably takes the form of a rod or tube bent to provide a pair of diverging arms 7 and axial extension 8, which latter is received within the handle as will be readily understood. The extreme ends of the arms 7 are preferably somewhat flattened as at 9 to receive between them a transverse frame member 10 here shown as a hollow tube or pipe. Obviously, however, the member 10 may have any desired cross section, as for example a square or oblong tube, an elliptical tube, or L-shaped, half round, and the like. The extreme ends of the transverse frame member 10, whatever its cross section may be, are secured to the flattened ends 9 of the arm 7, preferably by welding.

A plurality of teeth or tines 12, preferably formed of sheet metal of substantially crescent shape, as shown in Figs. 1 and 3, are secured in spaced relation through the length of the member 10, being attached thereto preferably by welding at points 13. The said tines 12 may, if desired, be provided with a reinforcing rib 14 stamped therein which serves to strengthen the tines and prevent bending thereof. If desired additional spacing and reinforcing members 15 may be interposed between adjacent tines, as clearly shown in Fig. 2. These members may take the form of short sections of a rod which are welded at each end to the adjacent tine or a single long rod may be passed through suitable apertures formed in the tines and welded thereto. These members 15 may be also employed by reversing the rake so as to bring them into engagement with the ground in smoothing the surface of the latter, as will be readily understood.

In the form of the invention shown in Fig. 4, the transverse member 10' is illustrated as of angle construction to which the tines or teeth 12' are secured by welding or otherwise. The said tines are of somewhat less depth than in the preceding form, and are of sheet metal having centrally located openings 16 cut or punched out thereof. The said openings are preferably surrounded by strengthening and reinforcing flanges or ribs 17, as shown.

In all forms of the rake, the tines are of such shape as to tend to prevent clogging, as above stated; but if grass, leaves, roots and the like, should become entwined about or between the said tines, they may be easily cleared by merely pushing the rake over the ground in a direction away from the operator. When so moved the tapering crescent shape of the tines effectively causes the tangled material to slide off the tines, as will be readily understood. Furthermore, the sheet structure of the tines is such that by pushing or pulling the rake while pressing down upon it, the tines act as disks, cutting through the soil and roots.

It is obvious that those skilled in the art may vary the precise details of construction without departing from the spirit of the invention, and therefore it is not wished to be limited to the above disclosure except as may be required by the claim.

What is claimed is:

A rake comprising a handle; a bifurcated frame member carried by said handle; a transverse frame member extending between and welded to the ends of said bifurcated member; and a plurality of flat substantially crescent-shaped tines edge welded to said transverse member in spaced relation and extending at approximately right angles therefrom.

In testimony whereof I affix my signature.

HAROLD WADE ROWLAND.